US007810439B2

(12) United States Patent
Bless

(10) Patent No.: US 7,810,439 B2
(45) Date of Patent: Oct. 12, 2010

(54) VEHICLE HITCH ENGAGEABLE TABLE

(76) Inventor: Frank Brian Bless, 55499 Lake Point Dr., Bass Lake, CA (US) 93604

( * ) Notice: Subject to any disclaimer, the term of this patent is extended or adjusted under 35 U.S.C. 154(b) by 0 days.

(21) Appl. No.: 12/422,922

(22) Filed: Apr. 13, 2009

(65) Prior Publication Data
US 2009/0255445 A1 Oct. 15, 2009

Related U.S. Application Data

(60) Provisional application No. 61/123,653, filed on Apr. 11, 2008.

(51) Int. Cl.
A47B 23/00 (2006.01)
(52) U.S. Cl. .................... 108/44; 224/521; 108/115
(58) Field of Classification Search .............. 108/44, 108/45, 115; 296/24.32, 26.01; 224/519, 224/518, 520, 521; 280/762; 297/158.4
See application file for complete search history.

(56) References Cited

U.S. PATENT DOCUMENTS

| 3,391,960 | A | * | 7/1968 | Megargle et al. | ........... 296/24.3 |
|---|---|---|---|---|---|
| 5,246,240 | A | * | 9/1993 | Romich et al. | ................ 108/44 |
| 5,368,209 | A | * | 11/1994 | Hill | ............................ 224/521 |
| 5,485,793 | A | * | 1/1996 | Crowell | ....................... 108/44 |
| 5,615,813 | A | * | 4/1997 | Ouellette | .................... 224/501 |
| 5,673,628 | A | * | 10/1997 | Boos | ............................ 108/44 |
| 5,857,741 | A | * | 1/1999 | Anderson | .................... 224/521 |
| 5,950,617 | A | * | 9/1999 | Lorenz | ......................... 108/44 |
| 6,082,269 | A | * | 7/2000 | Padberg | ....................... 108/44 |
| 6,189,458 | B1 | * | 2/2001 | Rivera | ......................... 108/44 |
| 6,314,891 | B1 | * | 11/2001 | Larson | ........................ 108/44 |
| 6,336,413 | B1 | | 1/2002 | Ball | |
| 6,511,088 | B2 | | 1/2003 | Kahlstorf | |
| 6,662,983 | B2 | * | 12/2003 | Lane et al. | ..................... 108/44 |
| 6,701,913 | B1 | | 3/2004 | LeDuc et al. | |
| 6,739,269 | B1 | | 5/2004 | Benton | |
| 7,090,104 | B2 | * | 8/2006 | Dorety | ........................ 224/519 |

* cited by examiner

Primary Examiner—José V Chen
(74) Attorney, Agent, or Firm—The Law Offices of Eric W Peterson

(57) ABSTRACT

A portable table system engageable with a trailer hitch receiver mounted on a vehicle. The device features a pair of tables which are rotationally engaged to a support structure to allow movement from a deployed horizontal position, to vertical positions in a stacked arrangement adjacent to the rear of a vehicle.

10 Claims, 3 Drawing Sheets

VEHICLE HITCH ENGAGEABLE TABLE

This application claims priority from U.S. Provisional Application No. 61/123,653 filed on Apr. 11, 2008 and which is incorporated herein in its entirety by reference.

FIELD OF THE INVENTION

The disclosed device relates to devices adapted for removable engagement with a trailer hitch receiver on a vehicle. More particularly the present invention relates to a portable table system which is rotationally engaged to support members which are adapted for removable engagement with the trailer hitch receiver conventionally positioned on the rear of vehicles. Such receivers conventionally are adapted to engage with the support bar for a trailer hitch and to support the tongue weight of a towed trailer.

BACKGROUND OF THE INVENTION

The ever increasing popularity of stadium sporting events, such as professional football, has caused a proportionate increase in the number of people attending the events. Conventionally, especially in cities where there is a lack of mass transit, spectators will drive to the stadium and park their vehicle adjacent to the stadium or sports venue in very large parking lots. Whether it was the exuberance of the spectators arriving early in anticipation of the game, or just spectators arriving early and hungry, a modern pastime has arisen in the parking lots of most such sports venues. This is the pre-game tailgate party.

At such pre-game parking lot parties, spectators bring food and barbecues or stoves along with refreshments and have a picnic or party adjacent to their vehicle parked in the parking lot. Such sports fans and spectators often bring food and beverages that are not available inside the sporting arenas and sit on their tailgates, or on their car trunks to dine and socialize. For most such spectators, sitting on the ground for their pre-game celebration and eating is not an attractive option due to traffic and the general nature of the hard pavement of parking lots. Consequently, spectators generally bring tables with them to support the food and beverages they bring to eat and share, in an elevated position. The tables are also employed to display the food and beverages for the guests at the parking lot party and sometimes to play games upon in passing the time.

The same need for tables to support food and eating utensils arises for people who may take their vehicle on a weekend drive away from home and a picnic. It is common during such a trek for picnics similar to tailgate parties to be enjoyed by the vehicle passengers in various venues, such as in parking lots of amusement parks, national forests, public picnic grounds, roadside parks, and other destinations away from home. Since their destination may ultimately lack tables, especially if it is in a wilderness or out of the way location, unless the vehicle passengers want to sit on the ground and battle with insects and wildlife, tables must be taken along in the vehicle for deployment at their destination to hold the food and beverages in an elevated position where it may be enjoyed with comfort.

While chairs may not be a necessity, since people can stand while eating, tables are for all practical purposes a necessity if users want to avoid sitting on the ground or constantly bending over to pick their food and drinks up off the ground.

However, with groups of people occupying the vehicle itself, vehicle interior space is at a premium for hauling food, drink, clothing, cooking equipment and the like, as well as the people themselves. Consequently, the addition of a large flat table or tables to the other items being hauled in the trunk or cargo area of the vehicle can severely impact the hauling capability of the vehicle.

Still further, in the case of larger vehicles like trucks and Sport Utility Vehicles, the seating area in the vehicle encourages hauling a large number of passengers. A larger number of passengers of course will require more table space once they arrive at their destination. However, bringing multiple tables to accommodate this need will also exacerbate the above noted problem of interior space running out for other items to be hauled in the vehicle.

As such, there exists an unmet need for a portable table system which may be hauled with the vehicle, outside of the vehicle thereby preserving the cargo and passenger hauling capability of the vehicle. Such a table system should be easy to engage with the vehicle itself to provide both a means to haul the table and a means to position the table surface in an elevated position without the need for legs on the table. Additionally, and of particular importance in the case of larger vehicles with more passengers, such a table system should provide multiple elevated table surfaces to accommodate the needs of a larger number of passengers the vehicle may carry.

Further, such a system should be adapted for easy engagement to, and removal from, the exterior of the vehicle to both encourage use, and allow for removal and storage during periods of non use. To this end, and to alleviate the need for straps and other supports to hold the device, such a table system should preferably be adapted to engage a conventional trailer hitch receiver which is already installed upon the exterior of many vehicles and which has standardized sizes and weight support characteristics. By adapting the table system to engage conventional trailer hitch receivers, users may engage the device to any of a plurality of vehicles having a conventional hitch receiver. This allows the users to buy new cars and still use the device, or to use it on any of a plurality of vehicles which may be used by the group attending a sporting event such as a football game.

With respect to the above, before explaining at least one preferred embodiment of the trailer hitch receiver engageable table system herein in detail or in general, it is to be understood that the hitch-receiver engageable table system disclosed herein is not limited in its application to the details of construction and to the arrangement of the components or the steps in the method set forth in the following description or illustrated in the drawings. The various components of the apparatus of the disclosed hitch-supported table invention are capable of other embodiments, and of being practiced and carried out in various ways, all of which will become obvious to those skilled in the art, once the information herein is reviewed. Also, it is to be understood that the phraseology and terminology employed herein are for the purpose of description and should not be regarded as limiting.

As such, those skilled in the art will appreciate that the conception upon which this disclosure is based, may readily be utilized as a basis for designing other hitch receiver supported table systems capable of carrying two tables, and for carrying out the several purposes of the present disclosed device and method. It is important, therefore, that the embodiments, objects and claims herein, be regarded as including such equivalent methodology and operational components insofar as they do not depart from the spirit and scope of the present invention.

SUMMARY OF THE INVENTION

The present invention features a novel trailer hitch receiver engageable table which provides a means to engage the table to a conventional trailer hitch receiver on any vehicle having such a receiver. Conventionally, trailer hitch receivers are a rectangular passage inside of a metal pipe or tube which is permanently engaged to the frame of the vehicle on which it is mounted. Trailer hitch balls, used to tow trailers are conventionally engaged to a member adapted to slidably engage within the hitch receiver. The member and the receiver have apertures therein which align and a pin is engaged therethrough to hold the hitch member in place.

The device herein features an engagement member having an exterior surface sized to operatively engage within the trailer hitch receiver on a vehicle. Apertures communicating through the engagement member align with apertures in the hitch receiver, and a removable pin may be engaged therethrough to hold the engagement member in a removable engagement with the hitch receivers.

In a preferred mode of the device, a distal end of the engagement member has a collar engaged thereon having a passage running therethrough. The passage is sized to slidably engage with a vertically disposed member which is engaged to a cross member supporting a pair of tables. The vertical member is slidably engaged in the collar and a compression fastener such as a set screw allows the vertical member to be adjusted toward and away from the ground surface to thereby raise or lower the cross member and connected tables.

The cross member is engaged to the vertical member slightly off center and has a horizontal axis substantially perpendicular to the vertical member. At a first end of the cross member it curves upward such that its axis is parallel to that of the vertical support member. At the first end, a first table support member is rotatably engaged to the cross member such that the table support member rotates around the vertical axis of the cross member.

At a second end of the cross member it curves in a direction away from the collar at the distal end of the engagement member and then upward such that the distal end is substantially vertically inclined. A second table support member is rotatably engaged to the second end of the cross member and rotates around the axis of the upwardly disposed second end of the cross member.

A first table is rotationally engaged to the first end of the cross member and is rotatable from a position where its planar top surface is substantially perpendicular to the horizontal axis of the cross member to a deployed position wherein its planar top surface is parallel to the horizontal axis of the cross member.

The first member has a stowed position wherein the top surface is perpendicular to the axis of the cross member and the bottom surface of the first table is adjacent to the collar and sandwiched between the collar and a second table which is engaged to the second table support member.

The second table is rotationally engaged to the second table support member and moveable from a deployed position where the top surface of the second table is parallel to the horizontal axis of the cross member to a stowed position wherein the top surface of the second table is adjacent to the first table.

The rearward curve of the horizontal portion of the cross member, at its second end, in a direction away from the collar and trailer hitch, is most important as it places the axis of the vertically disposed second end of the cross member, parallel to, but rearward of, the vertical axis of the first end of the cross member in its upward direction. Thus, when both the first and second tables are in the stowed position, the first table is positioned slightly forward of the second table and parallel to it. Without the rearward curve, the stacked vertical arrangement of the first and second tables in the stowed position would not be possible.

The foregoing has outlined rather broadly the more pertinent and important features of the hitch receiver engageable table device herein. This is provided in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other hitch engageable tables. It should also be realized by those skilled in the art that such equivalent constructions and methods do not depart from the spirit and scope of the invention as set forth in the appended claims.

In this respect, before explaining at least one embodiment of the invention in detail, it is to be understood that the invention is not limited in its application to the details of construction and to the arrangement of the steps or actions set forth in the following description or illustrated in the drawings. The invention is capable of other embodiments and of being practiced and carried out in various ways. Also, it is to be understood that the phraseology and terminology employed herein are for the purpose of description and should not be regarded as limiting.

THE OBJECTS OF THE INVENTION

It is therefore an object of the present invention to provide a trailer hitch receiver engageable table system.

It is a further object of the present invention to provide such a table system that provides two tables when deployed yet is compact when stowed for travel.

Yet another object of the invention is the provision of a portable table system that is adapted to engage any convention trailer hitch receiver making it portable and employable on multiple vehicles.

The foregoing has outlined some of the more pertinent objects of the invention. These objects should be construed to be merely illustrative of some of the more prominent features and applications of the intended invention. Many other beneficial results can be attained by applying the disclosed method and device in a different manner or by modifying the invention within the scope of this disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The accompanying drawings, which are incorporated in and form a part of this specification, illustrate embodiments of the invention and together with the detailed description, serve to explain the principles of this invention.

DETAILED DESCRIPTION OF THE PREFERRED EMBODIMENTS

Figure 1:
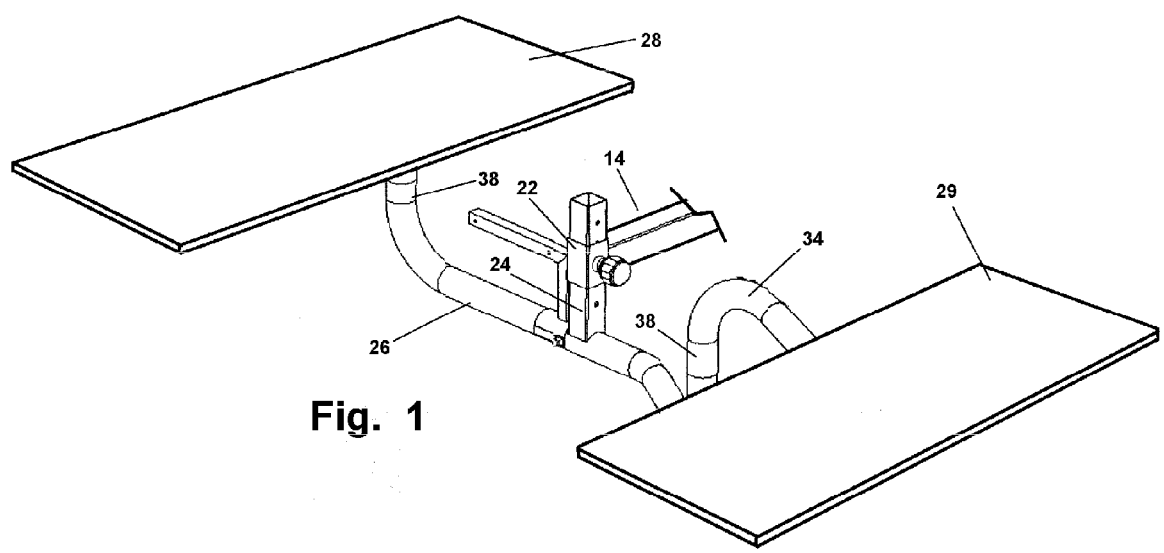
FIG. 1 depicts the table system in a deployed position engaged with a typical hitch receiver.
Figure 2:
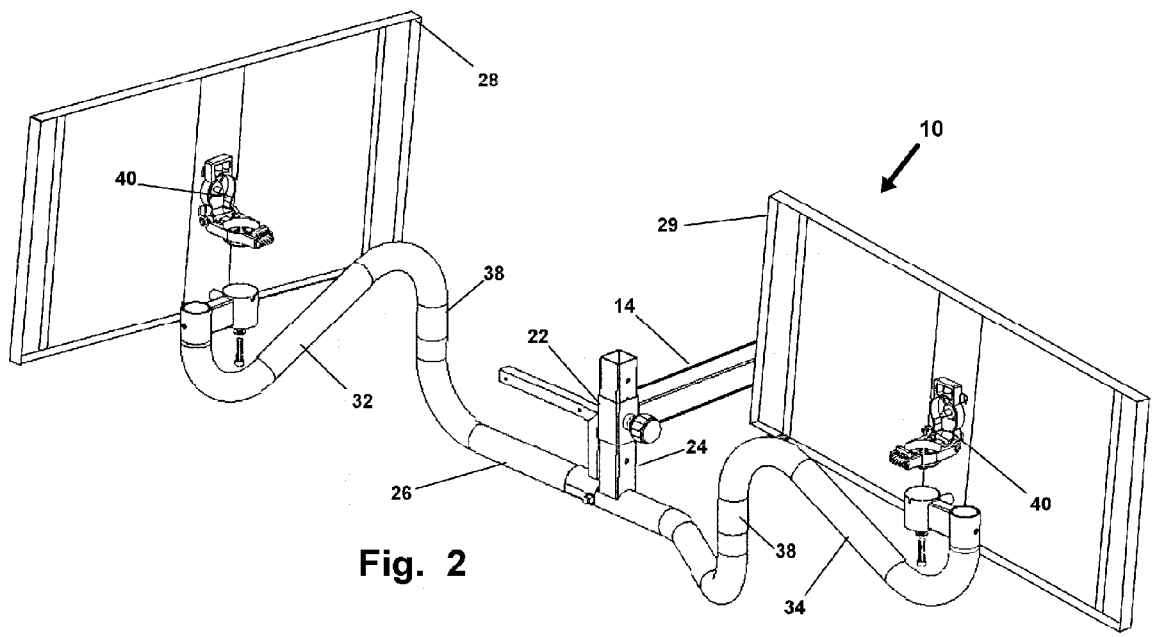
FIG. 2 depicts the device of FIG. 1 showing the rotational capability of the table support members and the table disengagement capability in case other tables might be added.

Referring now to FIGS. 1-4, wherein similar parts of the device 10 are identified by like reference numerals, there is seen in FIG. 1 the device 10 in a deployed position as it would appear engaged to a trailer hitch receiver 12 (FIG. 4) and suspended above the ground surface in a position ready for use.

The device 10 provides means to engage with the receiver 12 using an engagement member 14 having an exterior perimeter sized to slide within the trailer hitch receiver 12. Apertures 16 communicating through the engagement member 14 align with apertures in the hitch receiver 12. A removable pin 18 is engaged through the apertures to hold the engagement member 14 in a removable engagement with the hitch receiver 12.

In a preferred mode of the device 12, a distal end 20 of the engagement member 14 has a collar 22 attached which has a passage running therethrough. A vertically disposed support member 24 is slidably engaged in the collar 22 and also engaged to a cross member 26 supporting a pair of tables 28 and 29. The vertical support member 24 is adjustable in its sliding engagement in the collar 22. Means to fix the position of the vertical support member 24 is provided by a compression fastener such as a set screw 30 which thereby allows the vertical support member 24 to be adjusted toward and away from the ground surface and thereby provide a means to adjust the height of the tables 28 and 29 above the cross member 26 and hence above the ground to adjust to the preference and height of users.

The cross member 26 is horizontally disposed and engaged to the vertical support member 24 slightly off center. The vertical support member 24 is substantially perpendicular to the cross member 26 in this engagement. At a first end of the cross member 26 it curves upward such that its axis is substantially parallel to the axis of the vertical support member 24. At this first end, a first table support member 32 is rotatably engaged to the cross member 26 such that the first table support member 32 will rotate around the vertical axis of the owe-cross member 26.

At a second end of the cross member 26 while still in a horizontal disposition, the cross member 26 curves its axis in a direction away from the collar 22 and the receiver 12. As with the first end of the cross member 26 the second end curves upward such that its axis is substantially vertically inclined. A second table support member 34 is rotatably engaged to the second end of the cross member 26 allowing it a means to rotate around the axis of the upwardly disposed second end of the cross member 26. Means for rotation of both the first and second table support members 32, 34 currently is provided by a rotational engagement 38 in a collar or widening provided by one end of either the cross member 26 and the table support members 32, 34 being in a slip fit with the other. Other means for rotational engagement might be employed.

A first table 28 is rotationally engaged to the end of the first table support member 32 in two directions. Horizontal means for rotation is provided by rotational engagement of a hinge 40 with a fitting 42 located at the distal end of the first table support member 32. The hinge 40 also provides means to rotate the first table 28 from a substantially vertical position of FIG. 2 to a deployed position substantially horizontal in FIG. 1.

The second table 29 is also rotationally engaged to the end of the second table support member 3 using this rotational engagement of the hinge 40 which also provides the second table 29 means for rotation from a substantially vertical position to a substantially horizontal position. Thus both tables 28 and 29 will rotate along with the hinge 40 around a vertical axis and will both rotated from horizontal to vertical dispositions and back again to move the device 10 to the stowed position of FIGS. 3-4.

The end of the cross member 26 supporting the second table support member 34 is positioned slightly further from the collar 22 placing it rearward from the other end of the cross member 26 supporting the first table support member 32. This is particularly preferred in that it places the axis of the vertically disposed portion of the cross member 26 supporting the second table 29, parallel to, but rearward of, the vertical axis of the cross member 26 where it rotationally engages the first table support member 32. This provides for the first and second tables 28 and 29 to move to the stowed position of FIGS. 3-4 with the first table 28 positioned slightly forward of the second table 29 in a sequential or stacked positioning. This of course provides for a much more compact device 10 in the stowed position.

Set screws 44 may be employed to hold the rotational engagements of the first and second table support members 32 and 34 in their rotational engagements about the vertical axis of the ends of the cross member 26. Such set screws 44 or other means to temporarily cease rotation may also be employed to hold the hinges 40 from rotation once in the deployed position of FIG. 1.

The device 10 is thus deployable to the deployed position of FIG. 1 wherein the tables 28 and 29 may be rotated on the hinges 40 if desired to provide other horizontal positioning of the long axis of the tables 28 and 29. Additionally, the tables 28 and 29 may be positioned in line as in FIG. 1, or using the rotational engagement of the first and second table support arms 32 and 34, they may be positioned off center from each other should that be desired.

Figure 3:
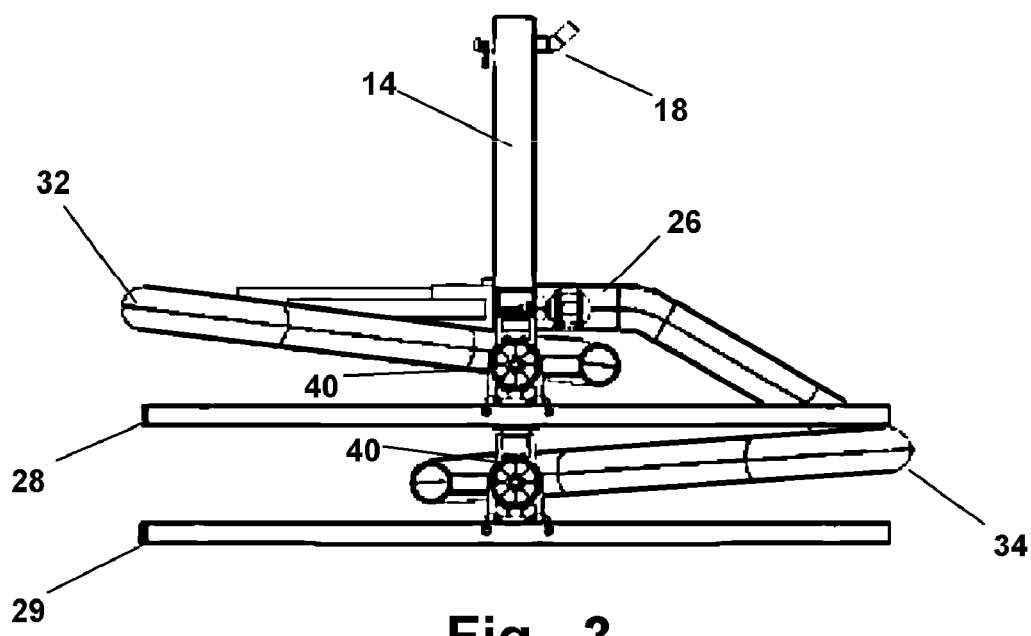
FIG. 3 is a top view of the device in a stowed position wherein the tables stack sequentially behind the vehicle on which the device is engaged in a compact fashion.
Figure 4:
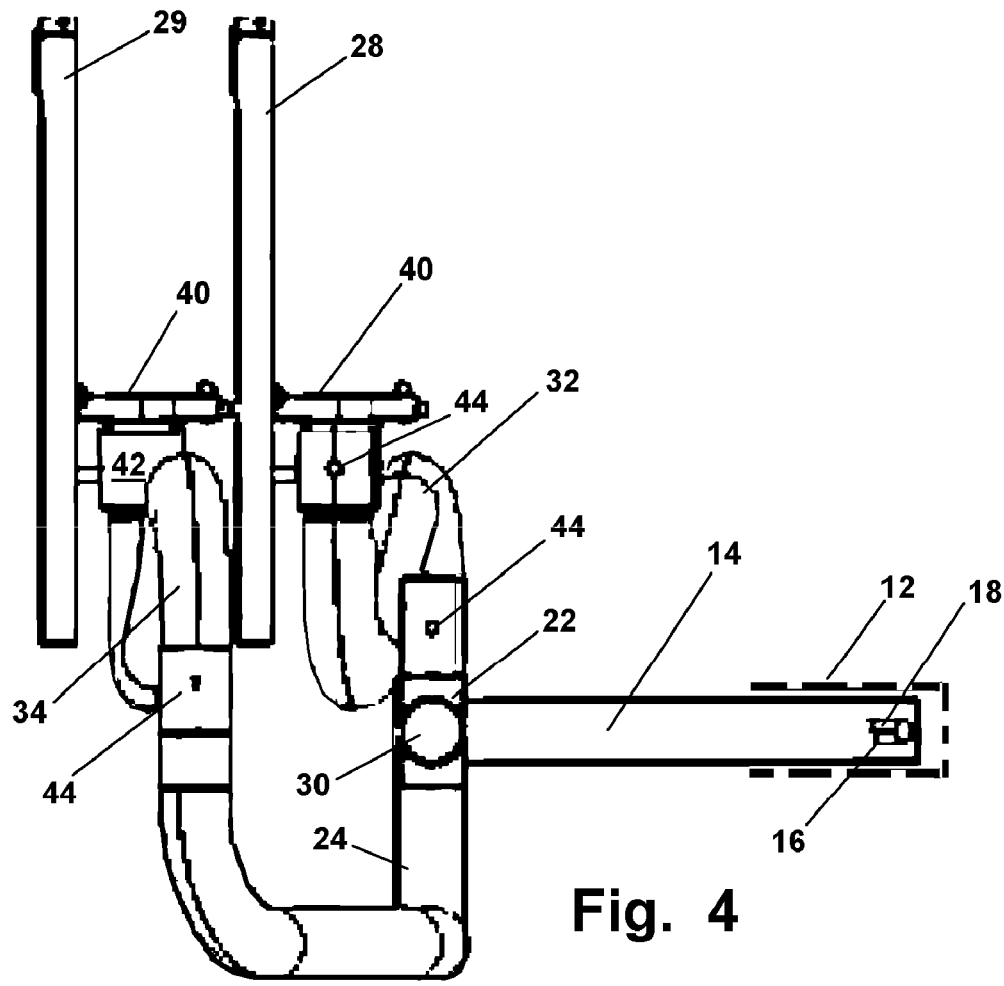
FIG. 4 is a side view of the device of figure three showing the sandwiched stacked engagement of one table in between the other table and the hitch enabled by the rearward curve of the horizontal support member.

To move from the deployed position of FIG. 1, to the stowed position of FIGS. 3 and 4, the tables 28 and 29 are rotated on the hinges 40 to vertical positions. The first table support member 32 is then rotated in its engagement to the end of the cross member 26 such that is adjacent to the collar 22. Then, the second table support member 34 is rotated in its rotational engagement with the cross member 26 to a position adjacent to the first table support member 32 thereby sandwiching the first table 28 in between the second table 29 and the vertical support 24. The various set screws 44 or other means for temporary cessation of the rotational engagements 38 of the first and second table support members 32 and 34 may be employed to hold the device in the stowed position.

Since the engagement member 14 easily slides from the hitch receiver 12, the device 10 may be removed from the vehicle for storage, or for mounting on another vehicle having a receiver 12.

While all of the fundamental characteristics and features of the disclosed trailer hitch receiver engageable table system have been described herein, with reference to particular embodiments thereof, a latitude of modification, various changes and substitutions are intended in the foregoing disclosure and it will be apparent that in some instances, some features of the invention will be employed without the corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

Further, the purpose of the herein disclosed abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A portable table assembly comprising:
   an engagement member adapted at a first end for engagement with a vehicle trailer hitch receiver;
   a support member engaged to a second end of said engagement member, said support member being substantially perpendicular to said engagement member;
   a cross member engaged to said support member, said cross member being substantially horizontal to a support surface for said vehicle;
   a first table support member rotationally engaged at a first end, to a first end of said cross member, said first table support member rotatable about a first vertical axis substantially normal to said cross member;
   a second table support member rotationally engaged at a first end, to a second end of said cross member, said second table cross member rotatable about a second vertical axis substantially normal to said cross member;
   a first table rotationally engaged to said first table support member at a second end thereof;
   a second table rotationally engaged to said second table support member at a second end thereof;
   means for rotation of said first table from a substantially vertical position, to a substantially horizontal position; and
   means for rotation of said second table from a substantially vertical position, to a substantially horizontal position.

2. The portable table assembly of claim 1 additionally comprising:
   said first vertical axis positioned between said second vertical axis and said second end of said engagement member;
   said table assembly having a deployed position and having a stowed position;
   said second table with said table assembly in said stowed position, being in said substantially vertical position with said second table support member rotated to position said second table adjacent to said support member; and
   said first table with said table assembly in said stowed position, being in said substantially vertical position with said first table support member rotated to position wherein said first table is sandwiched between said second table and said support member.

3. The portable table assembly of claim 2 additionally comprising:
   means for translation of said support member that provides vertical adjustment to thereby adjust a position of said first table and said second table.

4. The portable table assembly of claim 3 additionally comprising:
   means to temporarily fix said support member to thereby temporarily hold said first table and said second table in said position above said support surface.

5. The portable table assembly of claim 3 wherein said means for translation of said support member that provides vertical adjustment comprises:
   a collar engaged to said second end of said engagement member;
   a vertical support member engaged to a central portion of said support member; and
   said collar having an aperture sized to slidably engage over said vertical support member.

6. The portable table assembly of claim 5 additionally comprising:
   a locking screw threadably engaged through said collar and engageable in a compressed engagement with said vertical support member; and
   said compressed engagement providing means to temporarily fix said support member in position to thereby temporarily hold said first table and said second table in said position above said support surface.

7. The portable table assembly of claim 1 additionally comprising:
   means for translation of said support member that provides vertical adjustment to thereby adjust a position of said first table and said second table.

8. The portable table assembly of claim 7 additionally comprising:
   means to temporarily fix said support member to thereby temporarily hold said first table and said second table in said position above said support surface.

9. The portable table assembly of claim 7 wherein said means for translation of said support member that provides vertical adjustment comprises:
   a collar engaged to said second end of said engagement member;
   a vertical support member engaged to a central portion of said support member; and
   said collar having an aperture sized to slidably engage over said vertical support member.

10. The portable table assembly of claim 9 additionally comprising:
    a locking screw threadably engaged through said collar and engageable in a compressed engagement with said vertical support member; and
    said compressed engagement providing means to temporarily fix said support member in position to thereby temporarily hold said first table and said second table in said position above said support surface.

* * * * *